United States Patent
McNutt et al.

(10) Patent No.: US 7,788,476 B2
(45) Date of Patent: Aug. 31, 2010

(54) DEVICES, SYSTEMS, AND METHODS FOR INITIALIZING A PLC MODULE

(75) Inventors: Alan D. McNutt, Johnson City, TN (US); Mark Steven Boggs, Johnson City, TN (US); Temple L. Fulton, Elizabethtown, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 661 days.

(21) Appl. No.: 11/891,003

(22) Filed: Aug. 8, 2007

(65) Prior Publication Data

US 2008/0091932 A1 Apr. 17, 2008

Related U.S. Application Data

(60) Provisional application No. 60/836,217, filed on Aug. 8, 2006.

(51) Int. Cl.
G06F 15/177 (2006.01)
G06F 13/00 (2006.01)
G06F 13/14 (2006.01)
G05B 15/00 (2006.01)

(52) U.S. Cl. .............................. 713/1; 710/31; 710/38; 710/100; 710/104; 710/305; 700/1; 700/11

(58) Field of Classification Search .................... 713/1; 710/31, 38, 100, 104, 305; 700/1, 11
See application file for complete search history.

(56) References Cited

U.S. PATENT DOCUMENTS

| | | | |
|---|---|---|---|
| 5,036,489 A * | 7/1991 | Theobald | 365/73 |
| 5,287,353 A | 2/1994 | Buda | |
| 5,420,988 A * | 5/1995 | Elliott | 712/300 |
| 5,802,321 A | 9/1998 | Buda | |
| 5,802,389 A | 9/1998 | McNutt | |
| 6,914,914 B1 * | 7/2005 | Flood et al. | 370/503 |
| 7,086,036 B2 | 8/2006 | Boggs | |
| 2002/0172224 A1 | 11/2002 | Matteson et al. | |
| 2004/0156360 A1 | 8/2004 | Sexton et al. | |
| 2005/0255843 A1 * | 11/2005 | Hilpisch et al. | 455/425 |
| 2006/0095613 A1 | 5/2006 | Venkata et al. | |
| 2007/0124532 A1 * | 5/2007 | Bennett | 711/100 |

FOREIGN PATENT DOCUMENTS

| | | |
|---|---|---|
| EP | 0404414 A2 | 6/1990 |
| EP | 0404414 A3 | 6/1990 |
| EP | 619055 | 7/1993 |
| EP | 800668 | 7/1996 |
| WO | WO 9621181 A | 7/1996 |

OTHER PUBLICATIONS

"Gigabit Ethernet Bus", Ethernet Baseband Network Standard IEEE 802.3, Apr. 28, 2005, XP-002465120, USA.

* cited by examiner

*Primary Examiner*—Mark Connolly
(74) *Attorney, Agent, or Firm*—Jose de la Rosa

(57) ABSTRACT

Certain exemplary embodiments can comprise a system, which can comprise a module communicatively coupled to a programmable logic controller (PLC). The module can comprise a transmission circuit and/or a receiving circuit. The module can be adapted to communicate with the PLC via 8B/10B encoded frames. A frame of the 8B/10B encoded frames can comprise a plurality of ordered fields.

17 Claims, 12 Drawing Sheets

12000

US 7,788,476 B2

DEVICES, SYSTEMS, AND METHODS FOR INITIALIZING A PLC MODULE

CROSS-REFERENCES TO RELATED APPLICATIONS

This application claims priority to, and incorporates by reference herein in its entirety, pending U.S. Provisional Patent Application Ser. No. 60/836,217, filed 8 Aug. 2006.

BACKGROUND

Control systems can be used for monitoring parameters and/or controlling devices. Within control systems, one or more sensors can be communicatively coupled to a programmable logic controller (PLC) via one or more input/output (I/O) modules. Via an I/O module, the PLC can control one or more devices, such as a rheostat, switch, sequencer, stepper motor controller, servo controller, actuator controller, stepper drive, servo drive, stepper motor, servomotor, linear motor, motor, ball screw, servo valve, hydraulic actuator, and/or pneumatic valve, etc. The control system can be susceptible to faults resulting from equipment failure and/or data transmission errors (e.g., an I/O channel error).

SUMMARY

Certain exemplary embodiments can comprise a system, which can comprise a module communicatively coupled to a PLC. The module can comprise a transmission circuit and/or a receiving circuit. The module can be adapted to communicate with the PLC via 8B/10B encoded frames. A frame of the 8B/10B encoded frames can comprise a plurality of ordered fields.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, which can comprise a module communicatively coupled to a PLC. The module can comprise a transmission circuit and/or a receiving circuit. The module can be adapted to communicate with the PLC via 8B/10B encoded frames. A frame of the 8B/10B encoded frames can comprise a plurality of ordered fields.

Figure 1:
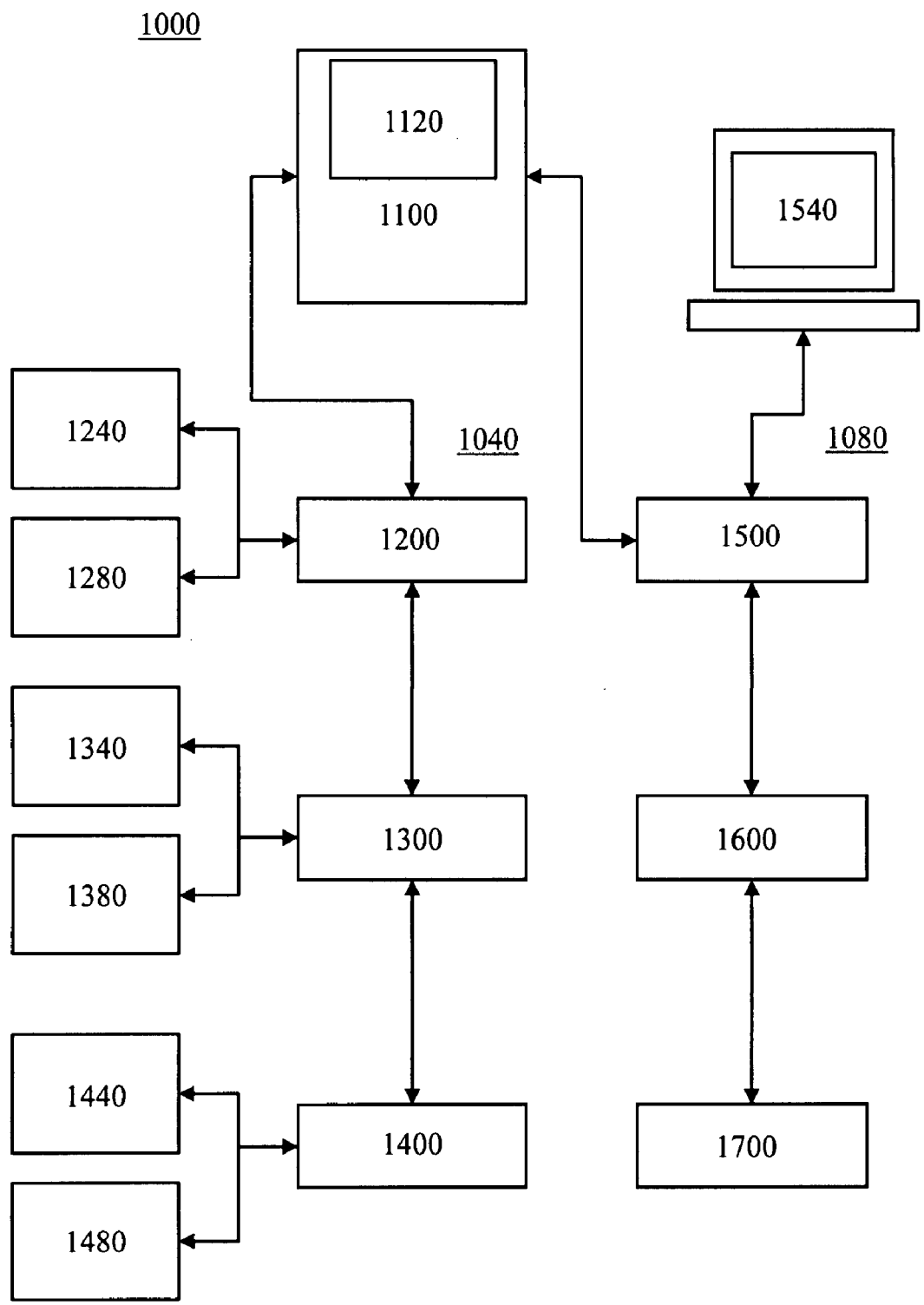
FIG. 1 is a block diagram of an exemplary embodiment of a system, 1000.

FIG. 1 is a block diagram of an exemplary embodiment of a system 1000, which can comprise a PLC 1100. PLC 1100 can comprise a circuit 1120. Circuit 1120 can be adapted to automatically perform any method or activity described herein. For example, circuit 1120 can be adapted to communicatively couple PLC 1100 to a first chain of modules 1040, which can comprise a first module 1200, a second module 1300, and a third module 1400. First module 1200, second module 1300, and third module 1400 can be communicatively coupled in a series arrangement. Each adjacent pair of first chain of modules 1040, such as first module 1200 and second module 1300 can be communicatively coupled in series. Each of first module 1200, second module 1300, and third module 1400 can be, and/or can be referred to as, I/O modules and/or I/O expansion modules, which can each be communicatively coupled to a corresponding plurality of sensors, such as a first sensor 1240, a second sensor 1340, and a third sensor 1440. Each of first module 1200, second module 1300, and third module 1400 can be communicatively coupled to a corresponding plurality of actuators such as a first actuator 1280, a second actuator 1380, and a third actuator 1480. Each of first module 1200, second module 1300, and/or third module 1400 can be adapted to communicate with PLC 1100 in hard real-time.

PLC 1100 can be communicatively coupled to a second chain of modules 1080, which can comprise a fourth module 1500, a fifth module 1600, and a sixth module 1700, which can be communicatively coupled in a series arrangement. Each adjacent pair of second chain of modules 1080, such as fourth module 1500 and fifth module 1600 can be communicatively coupled in series. Fourth module 1500, fifth module 1600, and sixth module 1700 can be, and/or can be referred to as, communications modules and/or annex modules, each of which can be communicatively coupled to a plurality of information devices, such as an information device 1540 (illustrated as being communicatively coupled to fourth module 1500).

Figure 2:
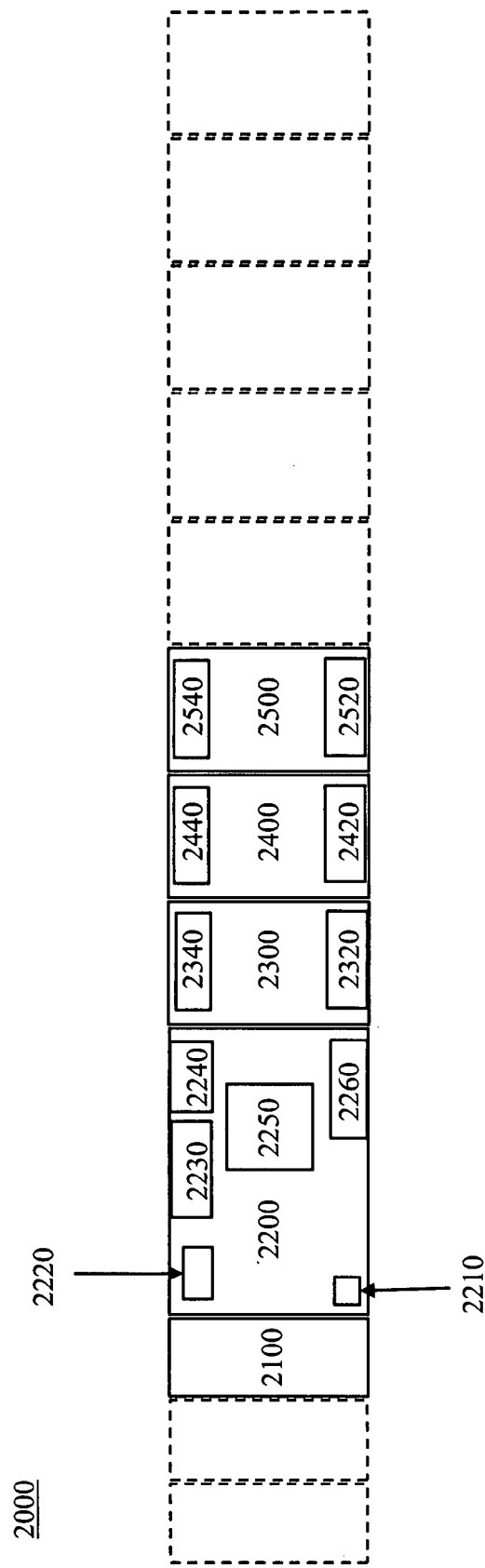
FIG. 2 is a block diagram of an exemplary embodiment of a rack 2000.

FIG. 2 is a block diagram of an exemplary embodiment of a rack 2000, which can comprise a PLC 2200. Rack 2000 can be adapted to support an addition of up to eight I/O modules to a first logical side of PLC 2200 and the addition of up to three communications annex modules to a second logical side of PLC 2200. PLC 2200 and an associated plurality of modules; such as a communications annex module 2100, a first I/O module 2300, a second I/O module 2400, and/or a third I/O module 2500; can comprise and/or be communicatively coupled via rack 2000. Certain exemplary systems might not support expansion racks.

PLC 2200 can comprise a memory card 2220, a digital input interface 2230, an analog input interface 2240, a central processing unit (CPU) 2250, an analog and/or digital output interface 2260, and/or an Ethernet interface 2210.

Slots within a rack can be numbered in, for example, ascending order from, for example, right to left, starting with slot 1, which can correspond to a location that communications annex module 2100 is mounted. The expansion I/O subsystem can support two types of modules, such as: 1) I/O expansion modules on a logical right of PLC 2200 and 2) Communications annex modules on a logical left of PLC 2200.

First I/O module 2300, second I/O module 2400, and third I/O module 2500 can each provide PLC 2200 with an interface to digital and analog signals from the field, such as via first input interface 2340, first output interface 2320, second input interface 2440, second output interface 2420, third input interface 2540 and third output interface 2520. First I/O module 2300, second I/O module 2400, and third I/O module 2500 might provide inputs or outputs or both inputs and outputs. There might not be restrictions to a module having a mix of digital and analog points.

Certain exemplary expansion modules can be adapted to do more than read and write I/O. Such modules can be adapted to post requests, which PLC 2200 can service according to a predetermined timing scheme, such as once per PLC scan cycle. PLC 2200 can be adapted to post requests, which a communicating module can then service.

Communications annex modules can be located to the logical left of PLC 2200. Communications annex modules can be adapted to provide a variety of electrical interfaces, but might not support I/O (digital or analog).

Communications annex module 2100 can be adapted to use universal asynchronous receiver-transmitter (UART) signals on an annex bus connector for implementing character based protocols. In such embodiments, an onboard processor of communications annex module 2100 can be adapted to perform maintenance tasks on an annex bus while CPU 2250 of PLC 2200 might control a communications via module 2100. Certain exemplary embodiments can determine which configuration information should be stored permanently.

Multi-byte values in messages can be big endian. Big endian can be a method of storing data that places the most significant byte of multiple byte values at a lower storage addresses. For example, a word stored in big endian format can place a least significant byte at the higher address and the most significant byte at a lower address.

An expansion subsystem can comprise enclosed modules, which can be mounted independently, without a common back plane. For expansion modules to the logical right of PLC 2200, an eight conductor sliding connector, which is part of each module, can be used to connect to the preceding module or PLC 2200. The sliding connector can be adapted to carry 5V power and logic signals. For communications annex modules to the logical left of PLC 2200 an eighteen pin male connector can be adapted to mate with a female connector in a preceding module or PLC 2200. These connectors can carry the power and logic signals utilized, for example, by operation of communications annex module 2100.

Figure 3:
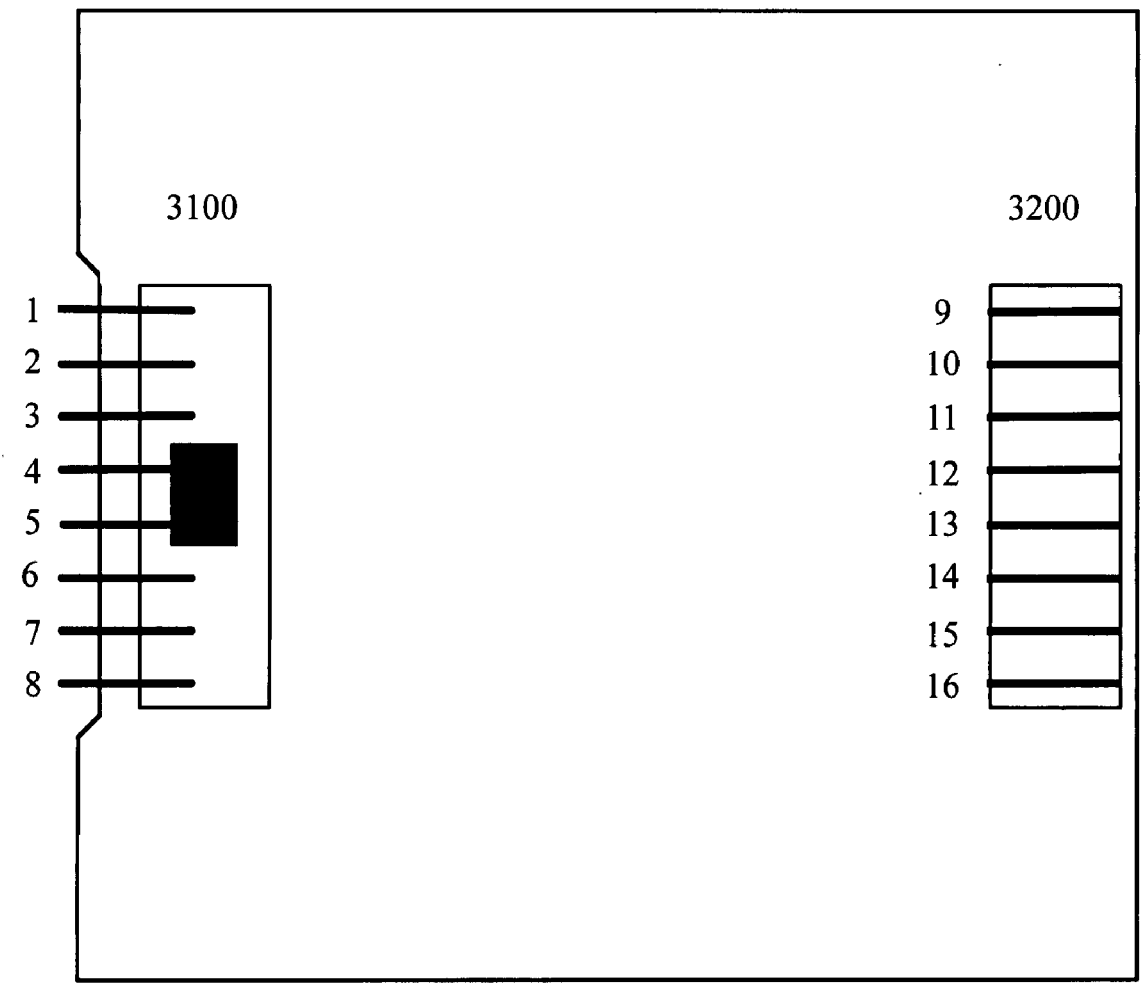
FIG. 3 is a top side view of an exemplary embodiment of an IO expansion module printed wiring board 3000.

FIG. 3 is a top side view of an exemplary embodiment of an I/O module printed wiring board 3000. An input side of each I/O expansion module can comprise an eight pin, male connector 3100 that slides to allow engagement into a receptacle 3200 mounted on an output side of a PLC or module implemented via printed wiring board 3000. On the output side of each IO expansion module and on the PLC can comprise an eight pin, female connector or receptacle 3200 designed to accept the pins of the sliding connector. FIG. 3 illustrates an exemplary printed wiring board (PWB) with the input and output connectors adaptable for use as an expansion module.

Table I defines an exemplary pin assignment of the slide connector and the receptacle illustrated in FIG. 3.

TABLE I

| Pin No. | Slide Connector Signal Name | | Receptacle Signal Name |
|---|---|---|---|
| 1 | +5 V | 9 | +5 V |
| 2 | GND | 10 | GND |
| 3 | CPU_L_Tx+ | 11 | MOD_R_Tx+ |
| 4 | CPU_L_Tx− | 12 | MOD_R_Tx− |
| 5 | +5 V | 13 | +5 V |
| 6 | GND | 14 | GND |
| 7 | CPU_L_Rx+ | 15 | MOD_R_Rx+ |
| 8 | CPU_L_Rx− | 16 | MOD_R_Rx− |
| Shield | GND | Shield | GND |

Figure 4:
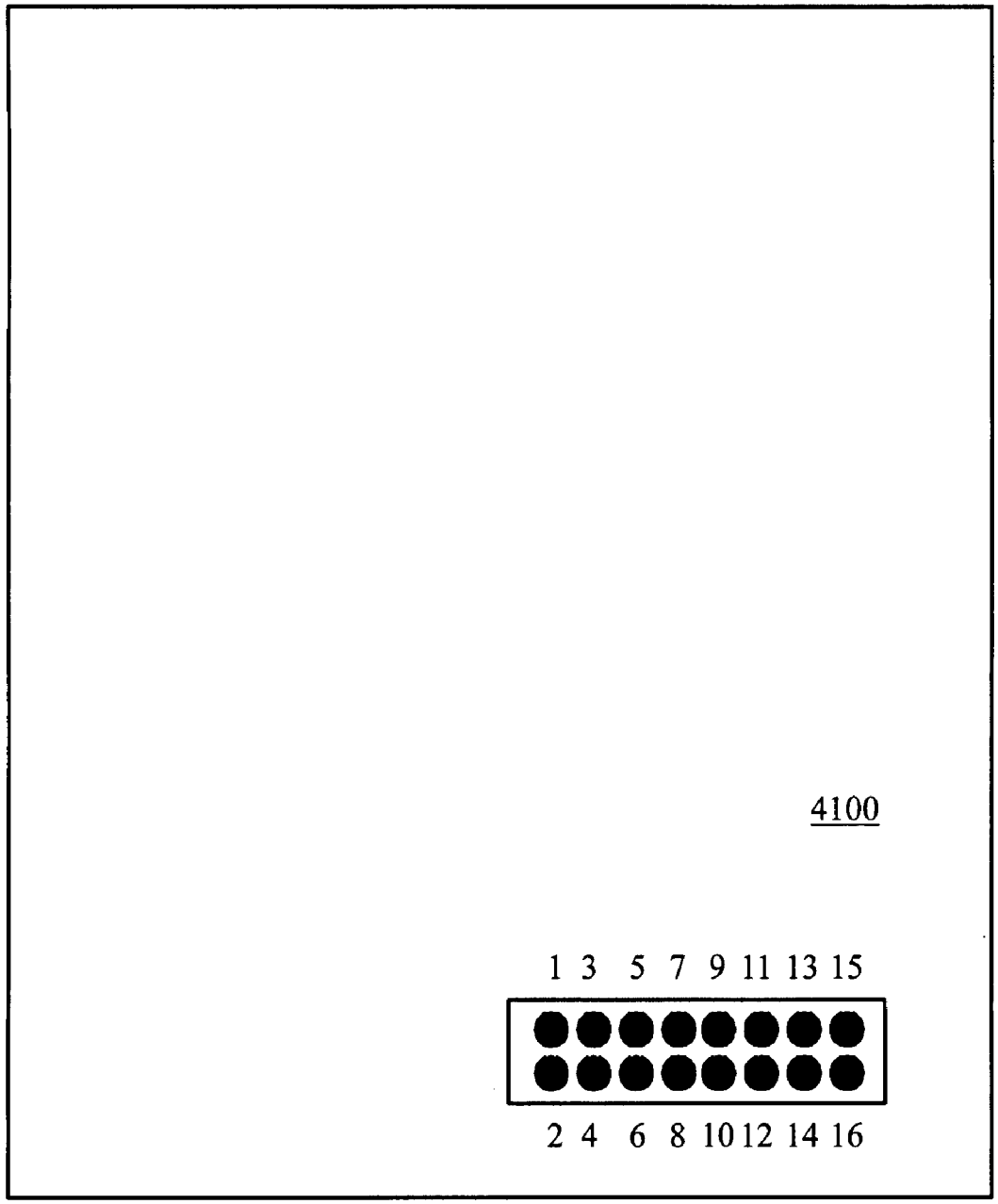
FIG. 4 is a bottom view of an exemplary embodiment of a communications annex module printed wiring board 4000.

FIG. 4 is a bottom view of an exemplary embodiment of a communications annex module printed wiring board 4000. A PLC side of exemplary annex modules can comprise a sixteen pin, male connector 4100 that engages with a receptacle mounted on the adjacent CPU or module. Male connector 4100 can comprise each of pins 1-16.

Figure 5:
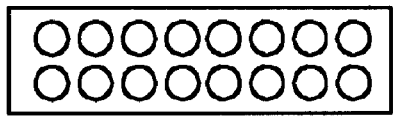
FIG. 5 is a top view of an exemplary embodiment of a communications annex module printed wiring board 5000.

FIG. 5 is a top view of an exemplary embodiment of a communications annex module printed wiring board 5000. On an opposing side of each annex module to the PLC side and on a first side of the PLC, certain exemplary embodiments can comprise a sixteen pin, female connector 5100, which can be adapted to accept the pins of a male cable and or board connector. Female connector 5100 can comprise pins labeled 17-32.

Table II defines an exemplary pin assignment of a communications annex module (left side expansion) male connector 4100 of FIG. 4 and female connector 5100 of FIG. 5.

TABLE II

| Pin No. | Receptacle Signal Name | | Plug Signal Name |
|---|---|---|---|
| 1 | Not used | 17 | Not used |
| 2 | 5 V | 18 | 5 V |
| 3 | 3.3 V | 19 | 3.3 V |
| 4 | GND | 20 | GND |
| 5 | GND | 21 | GND |
| 6 | Not used | 22 | Not used |
| 7 | Not used | 23 | Not used |
| 8 | Not used | 24 | Rx (Receive Data - input) |
| 9 | Not used | 25 | CTS(Clear to Send - RS232 input) |
| 10 | MOD_L_Rx+ | 26 | CPU_L_Rx+ |
| 11 | MOD_L_Rx− | 27 | CPU_L_Rx− |
| 12 | Not used | 28 | Tx (Transmit Data - output) |
| 13 | Not used | 29 | RTS (Request to Send - output) |
| 14 | MOD_L_Tx+ | 30 | CPU_L_Tx+ |
| 15 | MOD_L_Tx− | 31 | CPU_L_Tx− |
| 16 | C_GND (Chassis GND) | 32 | C_GND (Chassis GND) |

Access to I/O expansion and communications annex modules can be controlled by an application specific integrated circuit (ASIC) of the PLC system. Exemplary bus transactions can be implemented using request/response messages. Messages can be comprised of a series of bytes, which are transmitted serially using a bit protocol and 8B/10B encoding with a 32 bit CRC for error detection. Exemplary frames adapted to transmit the messages can be formatted and/or comprise fields according to a data structure as follows.

| | | | Message Length (LEN = 8 to 255 bytes) | | | | | |
|---|---|---|---|---|---|---|---|---|
| PRE | SOF | DA | LEN | SA | T | Data (0 to 247 bytes) | CRC (4 bytes) | EOF |

PRE—can be a preamble.

SOF—can be a start of frame.

DA—can be an eight bit address field that can identify a recipient of the message, such as by rack and slot.

SA—can be an eight bit address field can identify a message source, such as by a rack and/or slot.

| most significant bit | | | | | | | least significant bit |
|---|---|---|---|---|---|---|---|
| 7 | 6 | 5 | 4 | 3 | 2 | 1 | 0 |
| r | r | r | r | s | s | s | s | rrrrssss—can identify a address, such as a rack number (0 to 14, 15 can be reserved) and/or a slot number (0-15).

0x00—Rack 0, slot 0—can be an address reserved for a PLC.

0x0m—Rack 0, slot m—can be an address for a module, where m=1 to 15.

0xF0—Can be an un-configured address used during address assignment.

0xF3—Can broadcast message to a set of modules.

All other addresses can be reserved.

LEN—can be an eight bit length field specifying the number of bytes in the message (starting with DA and ending with CRC), 8 to 255 bytes.

Data—can be an optional message payload, which can consist of 0 to 247 bytes of data.

MT—can be an eight bit message type.

CRC—can be a 32 bit cyclical redundancy check code covering the fields between the SOF and the CRC (does not include SOF or CRC) that can provide error detection on messages.

EOF—can be a symbol and/or character indicative of an end of frame.

Exemplary modules can implement a hardware watchdog timer that can be reset by one or more firmware driven actions. The hardware watchdog timeout period can be application dependent. If the hardware watchdog timer ever expires, certain exemplary embodiments can automatically turn off digital module outputs and/or zero analog module outputs. Also the module processor can attempt to re-initialize.

In addition to the hardware watchdog timer certain exemplary modules can implement a message watchdog timer that can be reset by receipt of a valid message directed to the module's address. Broadcast messages might not reset the message watchdog timer, since broadcast messages might be unconfirmed. In the event that the message watchdog timer expires, certain exemplary embodiments can cause the module be set to a state equivalent to a power up state of the module. That is, certain exemplary embodiments can automatically turn off digital module outputs, zero analog module outputs (if no safe state configuration exists), and can set the module's address to an un-configured address, such as 0xF0. The message watchdog timer can comprise a configurable timeout period with a default of approximately 560 milliseconds with a plus or minus 5 percent tolerance.

At a time of power up certain exemplary modules can have a default station address of an un-configured value of 0xF0, which can indicate that the device has not yet been assigned an address. Until a module has been assigned an address and the assignment has been confirmed, certain exemplary embodiments might not pass messages from an input port to an output port of the module.

Figure 6:
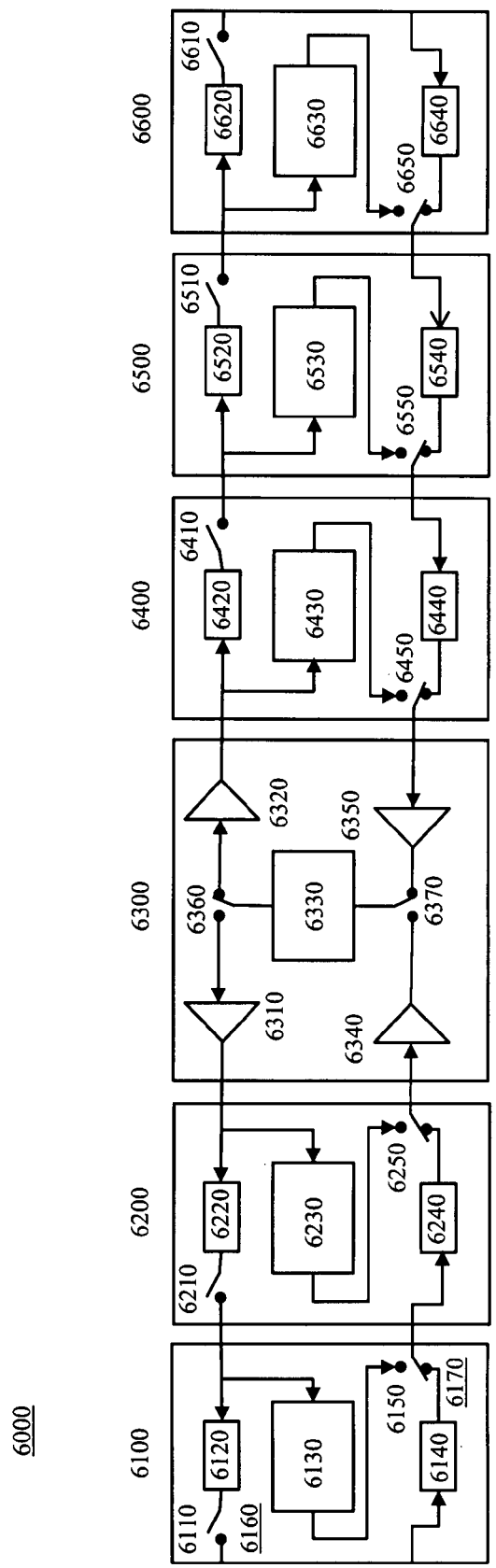
FIG. 6 is a block diagram of an exemplary embodiment of a system 6000.

FIG. 6 is a block diagram of an exemplary embodiment of a system 6000, which can comprise a first communications module 6100, a second communications module 6200, a PLC 6300, a first I/O module 6400, a second I/O module 6500, and/or a third I/O module 6600. PLC 6300 can comprise a transmission switch 6360 and a reception switch 6370. Messages transmitted via transmission switch 6360 can be sent to one or more modules via a first transmission interface 6310 or a second transmission interface 6320. PLC 6300 can comprise a communications controller 6330, which can be adapted to determine a position for each of transmission switch 6360 and/or reception switch 6370. Messages received via reception switch 6370 can be received from one or more modules via a first reception interface 6340 or a second reception interface 6350. In certain exemplary embodiments, first communications module 6100, second communications module 6200, PLC 6300, first I/O module 6400, second I/O module 6500, and/or third I/O module 6600 can be implemented via software, firmware, hardware, an ASIC, a customer programmable logic device (CPLD) and/or an field programmable gate array (FPGA), etc.

First communications module 6100, second communications module 6200, first I/O module 6400, second I/O module 6500, and/or third I/O module 6600 can each comprise a corresponding components, which can comprise, respectively:

communications controllers 6130, 6230, 6430, 6530, and 6630;

reception switches 6110, 6210, 6410, 6510, and 6610;

transmission switches 6150, 6250, 6450, 6550, and 6650;

reception repeaters and/or delay circuits 6120, 6220, 6420, 6520, and 6620; and/or transmission repeaters and/or delay circuits 6140, 6240, 6440, 6540, and 6640.

In certain exemplary embodiments, each module can comprise a reception switch, which can be comprised by a reception circuit. For example, reception switch 6110 can be comprised by a reception circuit 6160. In certain exemplary embodiments, a transmission circuit can comprise a transmission switch. For example, transmission switch 6150 can be comprised by a transmission circuit 6170.

As an exemplary reception repeater and/or delay circuit, reception repeater and/or delay circuit 6220 can be adapted to repeat transmissions, with a predetermined time delay, from a direction of PLC 6300 toward first communication module 6100 of a first chain of modules that comprises first communication module 6100 and second communication module 6200. Reception repeater and/or delay circuit 6220 can comprise and/or be communicatively coupled to reception switch 6210. Switch 6210 can be adapted to default to an open position prior to an assignment of a module address to second module 6200 by PLC 6300. Switch 6210 can be adapted to remain in the open position until the module address is assigned to the first module. Switch 6210 can be is adapted to close subsequent to the assignment of the module address to the first module.

As an exemplary transmission repeater and/or delay circuit, transmission repeater and/or delay circuit 6240 can be adapted to repeat transmissions, with a predetermined time delay, from a direction of first communication module 6100 toward PLC 6300. Transmission repeater and/or delay circuit 6240 can comprise and/or be communicatively coupled to reception switch 6250. Switch 6250 can be dynamically controlled to allow transmission from second module 6200 toward PLC 6300 when second module 6200 has information to send, and/or selects the second repeater to allow any message presented from the direction of first module 6100 to be repeated toward PLC 6300.

First communications module 6100, second communications module 6200, first I/O module 6400, second I/O module 6500, and/or third I/O module 6600 can be adapted to communicate with PLC 6300 via 8B/10B encoded frames. A frame of the 8B/10B encoded frames can comprise a message type field of a size that corresponds to eight bits. A value stored in the message type field can be indicative of content of a data field of a particular frame. The message type field can follow a first ordered sequence of fields comprised by the particular frame. The first ordered sequence of fields can be and/or can comprise a preamble field, a start-of-frame field, a destination address field, a length field, and/or a source address field. The message type field can be followed by a second ordered sequence of fields comprised by the frame. The second ordered sequence can be and/or can comprise a data field, a cyclic redundancy check field of a size that corresponds to 32 bits, and/or an end of frame field. The destination address field can be adapted to receive a value that is indicative of an un-configured address used during address assignment of one or more of a chain of modules. The destination address field can be adapted to receive a value that is indicative of broadcast address that can be used to broadcast a message to all of the chain of modules. A message transmitted via system 6000 can be via 8B/10B encoded frames and/or can be a serially transmitted message.

Switches in transmit and receive data paths can indicate a configuration of modules prior to address assignment. For example, in system 6000, reception switches 6110, 6210, 6410, 6510, and 6610 are illustrated as open, which can prevent messages from being passed downstream until the address assignment has been made. Transmission switches 6150, 6250, 6450, 6550, and 6650, in system 6000, can be adapted to select a flow of data from a downstream path until a corresponding module issues a reply. First communications module 6100 can be adapted to use UART signals for character protocol support.

Figure 7:
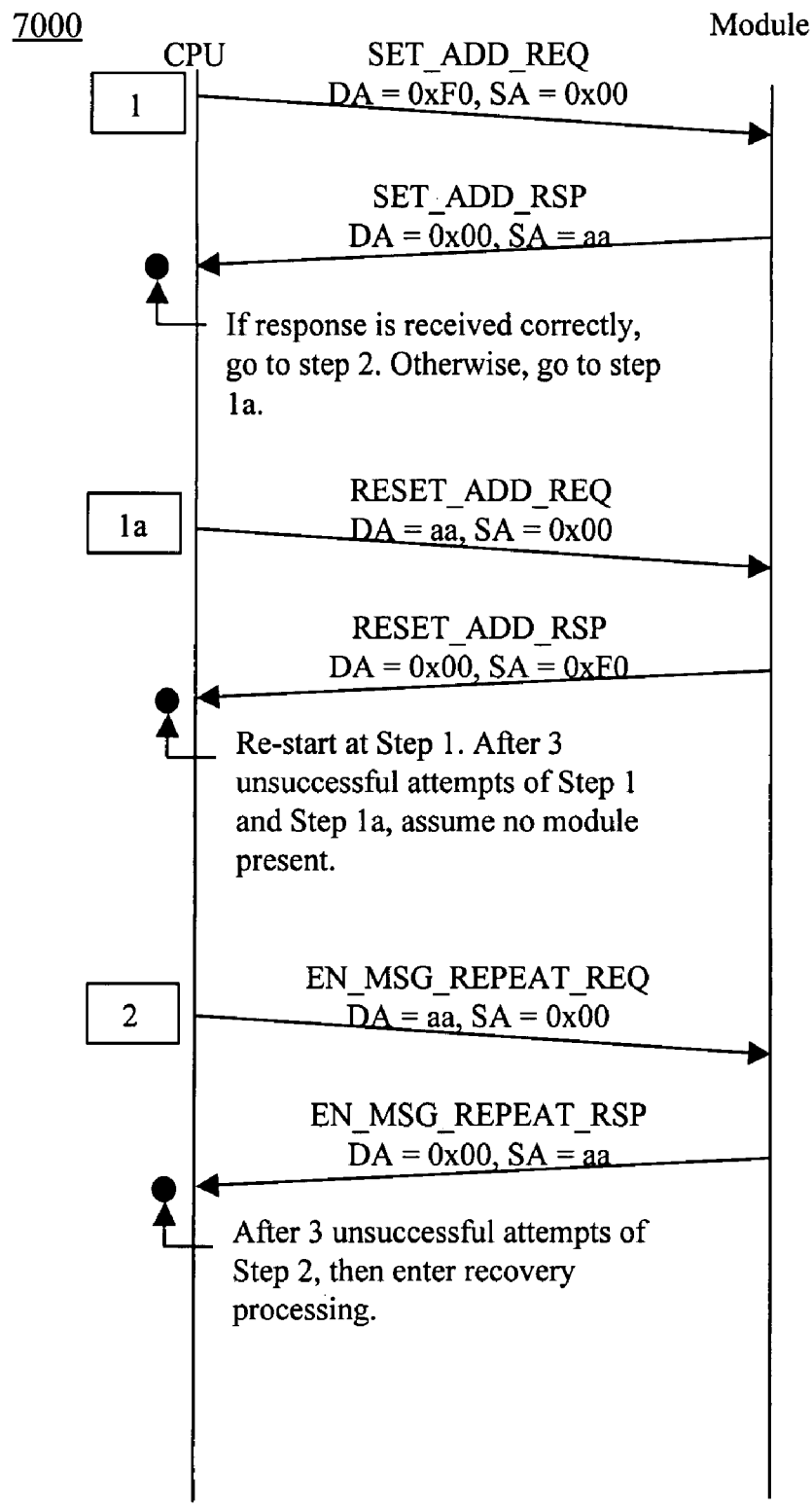
FIG. 7 is signaling diagram of an exemplary embodiment of a system 7000.

FIG. 7 is an exemplary embodiment of signaling diagram. The illustrated sequence of messages can be used to assign an address to a module. An expected sequence with no errors can be Step 1 followed by Step 2. If an error prevents the successful completion of Step 1, then the reset address message of Step 1*a* can be sent at least once before repeating the set address request.

At step 1, a programmable logic controller (PLC) can be adapted to send a first message to a module. The first message can be transmitted via a first 8B/10B encoded frame that comprises a destination address corresponding to an eight bit default and/or un-configured module address of the module. The first message can be adapted to set a module address of the module to an assigned address value and/or transmit a reply message via a second 8B/10B encoded frame that can comprise a source address that can confirm the assigned address value has been assigned to the module by the first message. The first 8B/10B encoded frame can comprise a message type field of a size that can correspond to eight bits. A value stored in the message type field can be indicative of content of a data field of the frame. The message type field can follow a first sequence of fields comprised by the frame. The first sequence of fields can be and/or can comprise a preamble field, a start-of-frame field, a destination address field a length field, and/or a source address field. The message type field can be followed by a second ordered sequence of fields comprised by the frame. The second ordered sequence can be and/or can comprise a data field, a cyclic redundancy check field of a size that corresponds to 32 bits, and/or an end of frame field.

Responsive to one or more failures, such as three successive failures, to receive the second 8B/10B encoded frame, the PLC can be adapted to determine that no module exists that is assigned the default module address. In certain exemplary embodiments, the PLC can receive a response to the first message. The response can be comprised by a third 8B/10B encoded frame. The third 8B/10B encoded frame can comprise an error code field that can comprise a value indicative that a message type of the first message comprised an invalid address for the module address.

At step 1*a*, responsive to a failure to receive the reply message, the PLC can send a second message via a third 8B/10B encoded frame to said module. The second message can be adapted to set the module address to the default module address, which can be and/or correspond to an eight bit address. Responsive to the second message, the PLC can receive a response message sent by the module via a fourth 8B/10B encoded frame. The response message can be adapted to confirm that the module address has been reset to the default module address.

At step 2, the PLC can be adapted to send a third message via a fifth 8B/10B encoded frame to the module. The third message can be adapted to cause the module to enable communications with a communicatively coupled second module and/or to send a confirming message acknowledging receipt and action in response to the third message. Responsive to said third message, the PLC can be adapted to receive the confirming message transmitted from the module via a sixth 8B/10B encoded frame. In certain exemplary embodiments, the PLC can be adapted to receive a response to the third message. The response comprised by a seventh 8B/10B encoded frame. The seventh 8B/10B encoded frame can comprise an error code field that contains a value indicative that communication has already been enabled to a communicatively coupled second module.

In certain exemplary embodiments, responsive to a failure to receive the confirming message the PLC can be adapted to execute a recover procedure. The PLC can be adapted to repeatedly send the third message prior to determining the failure to receive the confirming message. For example, the PLC can send the third message three times prior to determining the failure to receive the confirming message. The recover procedure can be adapted to perform diagnostic tests via which the PLC can determine a cause of the failure to receive the confirming message. In certain exemplary embodiments, the recover procedure can be adapted to automatically alert and/or notify a user of the failure to receive the confirming message.

If a message type included in a request message to a device is unsupported by that device or is unsupported in the current mode of the device and/or the PLC encounters a problem in the processing of the request message, then the device can return in the response message:

TABLE III xxxxxxxx(—)

DA = 0x00
LEN = 0x0D
SA = aa
MT = original MT OR 0x80
DEV_CLS = dd

TABLE III-continued xxxxxxxx(—)

DEV_TYP = tt
DEV_STAT = ss
ERR_CLS = 0x7F
ERR_COD = ee

| Field | Value | Description |
|---|---|---|
| DA | 0x00 | The destination address (CPU) |
| SA | Aa | The address of the responding device |
| MT | original MT OR 0x80 | Message Type Response - requested command not accepted |
| DEV_CLS | Dd | Code identifying the device class |
| DEV_TYP | Tt | Code identifying the device type |
| DEV_STAT | Ss | Device status - (see SET_ADD_RSP(+) for complete description) |
| ERR_CLS | 0x7F | Device non-fatal error |
| ERR_COD | Ee | Unsupported message type (E_UNSUPPORTED_CMD) or Unsupported message type in current operating mode (E_UNSUPPORTED_INMODE) |

Response (—)

| Error | Code | Description |
|---|---|---|
| E_UNSUPPORTED_CMD | 0x80 | Request message contains unsupported message type |
| E_UNSUPPORTED_INMODE | 0x81 | Request message contains message type unsupported in current operating mode |
| E_ILLEGAL_ADDR | 0x82 | Illegal address specified in address assignment |
| E_REPEAT_ALREADY_ENABLED | 0x83 | Message pass-through already enabled |
| E_INCORRECT_IO_COUNT | 0x84 | Incorrect I/O count - I/O read/write request not consistent with module's actual I/O count |
| E_ILLEGAL_COMP_NUMBER | 0x85 | Specified component number is illegal |
| E_ILLEGAL_COMP_INMODE | 0x86 | Specified component number is illegal in current operating mode |
| E_WRITE_TO_MEMORY_FAILED | 0x87 | Write operation to memory device failed |
| E_UPDATE_NOT_IN_PROGRESS | 0x88 | A component update operation is not in progress |
| E_UPDATE_IN_PROGRESS | 0x89 | A component update operation is already in progress |
| E_ILLEGAL_MSG_FORMAT | 0x8A | Illegal message format (e.g. payload length not expected, . . . ) |
| E_ILLEGAL_CONTENT | 0x8B | Illegal downloaded content |
| E_ILLEGAL_COMPONENT | 0xFx | Illegal component discovered (boot mode only) bit 0: 1 = illegal IID bit 1: 1 = illegal MID bit 2: 1 = illegal FWA |

In the description of each message type, a block can be displayed that describes any address restrictions on request messages containing that message type. For example, the block can indicate whether a value in a message type field is indicative of an allowed destination address. For example, the block can indicate that a destination address is indicative of a broadcast message adapted to be received by a plurality of modules. The block can indicate that the destination address is unconfigured and/or has been assigned a default address. The block can indicate that the destination address corresponds to a valid, legal, and/or allowed address, such as an address corresponding to a valid legal and/or allowed rack and/or slot.

Certain exemplary embodiments can provide some amount of digital and analog I/O built-in. The built-in analog I/O might be available as digital inputs as well. Determination of the digital value of the analog inputs can be made as defined in TABLE IV.

TABLE IV

| Digital Input Present State | Analog Input Voltage | Digital Input Next State |
|---|---|---|
| 0 | >8 V | 1 |
| 1 | <6 V | 0 |

Certain exemplary embodiments can have an ability to increase the I/O count by adding either an I/O annex card or I/O expansion modules or both an I/O annex card and I/O expansion modules.

Figure 8:
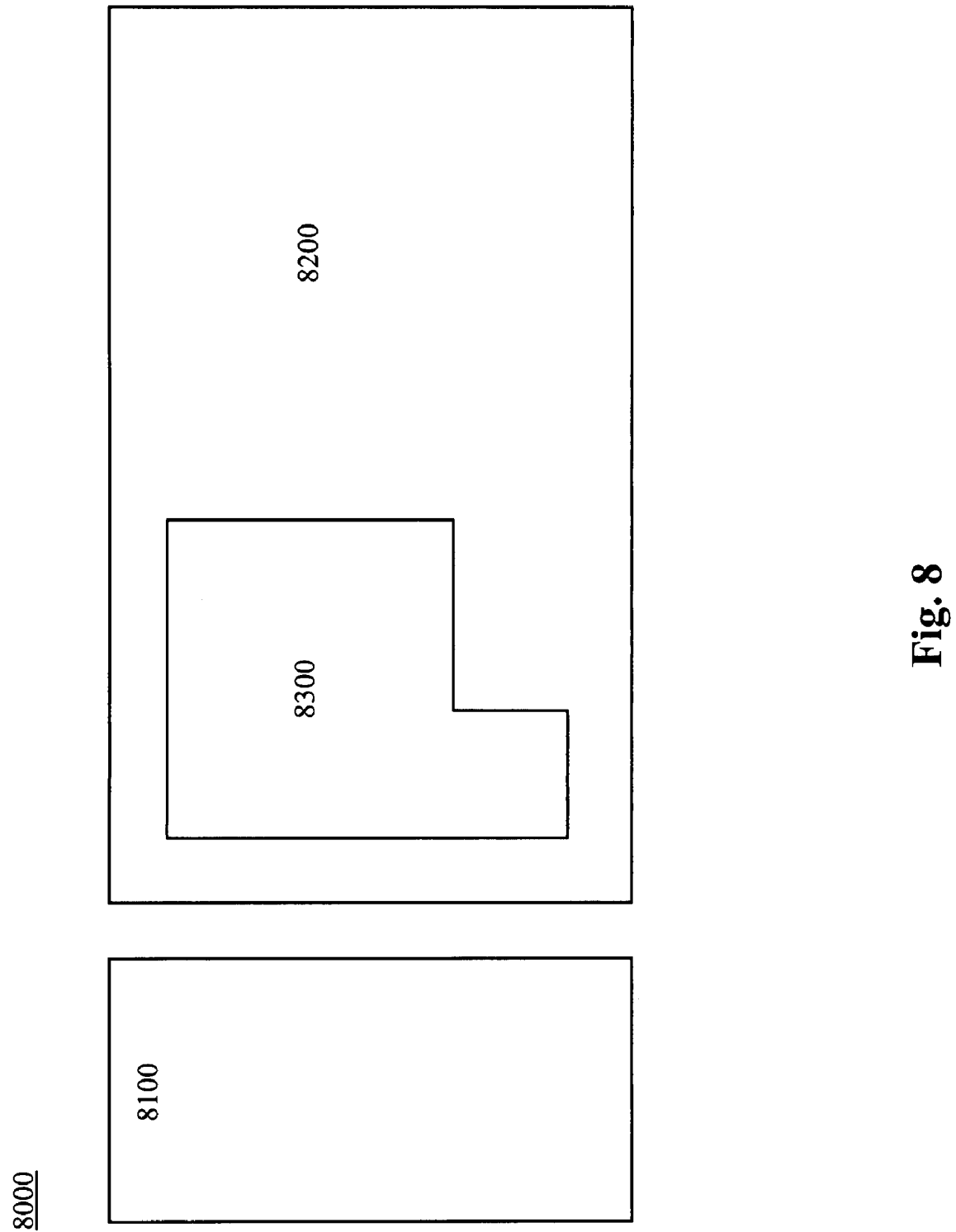
FIG. 8 is a block diagram of an exemplary embodiment of a system 8000.

FIG. 8 is a block diagram of an exemplary embodiment of a system 8000, which can comprise a PLC 8200. Certain exemplary embodiments can support the addition of up to three annex modules (Annex Port 0), such as annex module 8100, and an annex card (Annex Port 1), such as annex card 8300. I/O annex card 8300 can be installed under a hatch in a housing of PLC 8200. Communications annex modules such as annex module 8100 can be added to a logical left side of PLC 8200.

Figure 9:
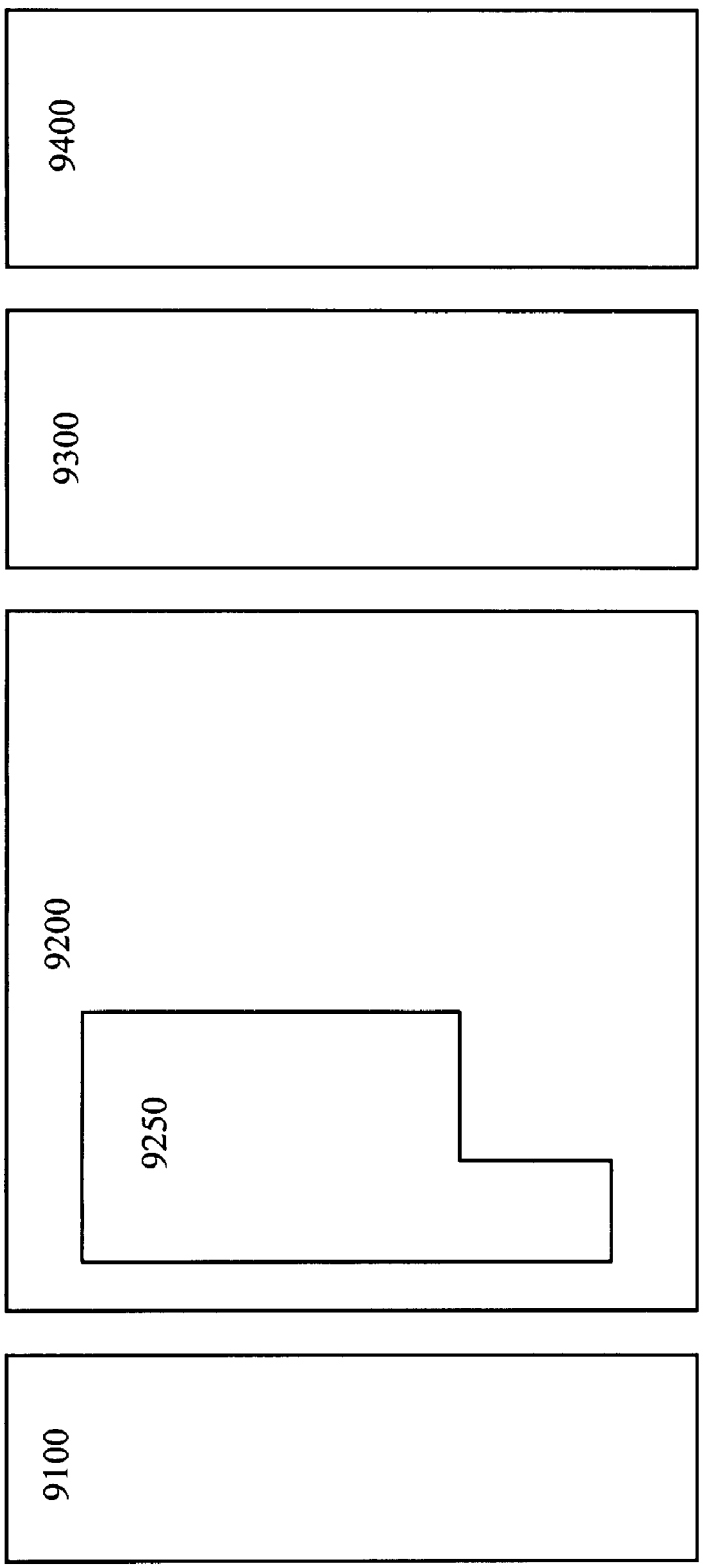
FIG. 9 is a block diagram of an exemplary embodiment of a system 9000.

FIG. 9 is a block diagram of an exemplary embodiment of a system 9000, which can comprise a PLC 9200, a communications annex module 9100, and/or an I/O annex card 9250. PLC 9200 can support an addition of up to three annex modules, annex card 9250, and/or up to two expansion I/O modules, such as first I/O module 9300 and second I/O module 9400.

Certain exemplary embodiments can support the addition of up to three annex modules, annex card 9250, and/or up to eight expansion I/O modules communicatively coupled to PLC 9200.

Figure 10:
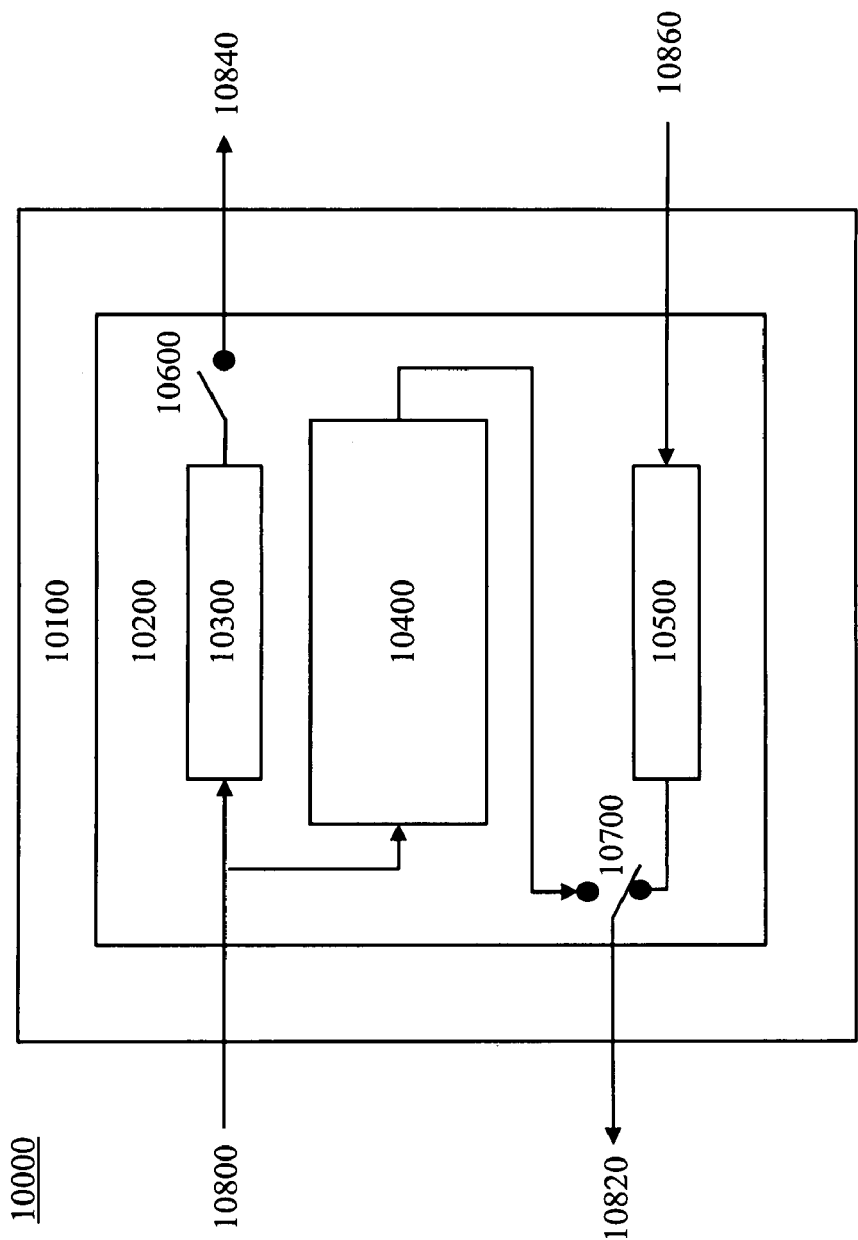
FIG. 10 is a block diagram of an exemplary embodiment of a system 10000.

FIG. 10 is a block diagram of an exemplary embodiment of a system 10000, which can comprise an expansion module 10100. Expansion module 10100 can comprise an ASIC 10200. ASIC 10200 can comprise a first delay and/or repeater circuit 10300, which can be adapted to repeat and/or introduce one or more characters (for example, two characters) as a delay in a transmission of a first message from the PLC and/or a module logically upstream of expansion module 10100 relative to the PLC. The first message can be sent to modules communicatively coupled to expansion module 10100 and logically downstream of expansion module 10100 relative to the PLC. ASIC 10200 can comprise a second delay and/or repeater circuit 10500, which can be adapted to repeat and/or introduce one or more characters (for example, two characters) as a delay in a transmission of a second message from expansion module 10100 and/or a module logically downstream of expansion module 10100 relative to the PLC. The second message can be sent to the PLC and/or modules communicatively coupled to expansion module 10100 and logically upstream of expansion module 10100 relative to the PLC. First delay and/or repeater circuit 10300 and/or second delay and/or repeater circuit 10500 can be adapted to add characters to messages and/or frames to synchronize communications and/or processing within expansion module 10100.

In certain exemplary embodiments, expansion module 10100 can comprise a PLC IN port 10800 adapted to receive communications from a PLC and/or a module serially connected to the PLC. Expansion module 10100 can comprise a PLC OUT port 10820, which can be adapted to communicatively couple and/or transmit messages, from expansion module 10100 and/or other modules communicatively coupled to expansion module 10100, to the PLC and/or modules logically between expansion module 10100 and the PLC. Expansion module 10100 can comprise a Module OUT port 10840, which can be adapted to provide a communicative coupling with a next module communicatively coupled, such as in a series arrangement, to expansion module 10100. Expansion module 10100 can comprise a Module IN port 10860, which can be adapted to receive communications from other modules that are directed to expansion module 10100, other modules logically between module 10100 and the PLC, and/or the PLC. Via a pair of "IN" and "OUT" ports, modules can be adapted to provide a full duplex channel of communications between modules and/or between modules and the PLC.

Certain exemplary embodiments can comprise a communications controller 10400, which can regulate routing of transmissions and/or receptions associated with expansion module 10100. Transmission from the PLC can be received via PLC IN port 10800. Transmissions to the PLC can be sent via PLC OUT port 10820. In certain exemplary embodiments, a first switch 10600 can be closed after address assignment. In certain exemplary embodiments, a second switch 10700 can change state when the module responds to a request.

In certain exemplary embodiments, module addresses can be assigned. Expansion module 10100 can be adapted to power up with a default and/or un-configured address assignment and with first switch 10600 open. The PLC can be adapted to send a set module address to a first module on a local rack. In certain exemplary embodiments, until a module has been assigned an address other than the default and/or un-configured address, first switch 10600 can remain open. In certain exemplary embodiments, module addresses can be assigned to modules sequentially until all address assignments have been made.

Figure 11:
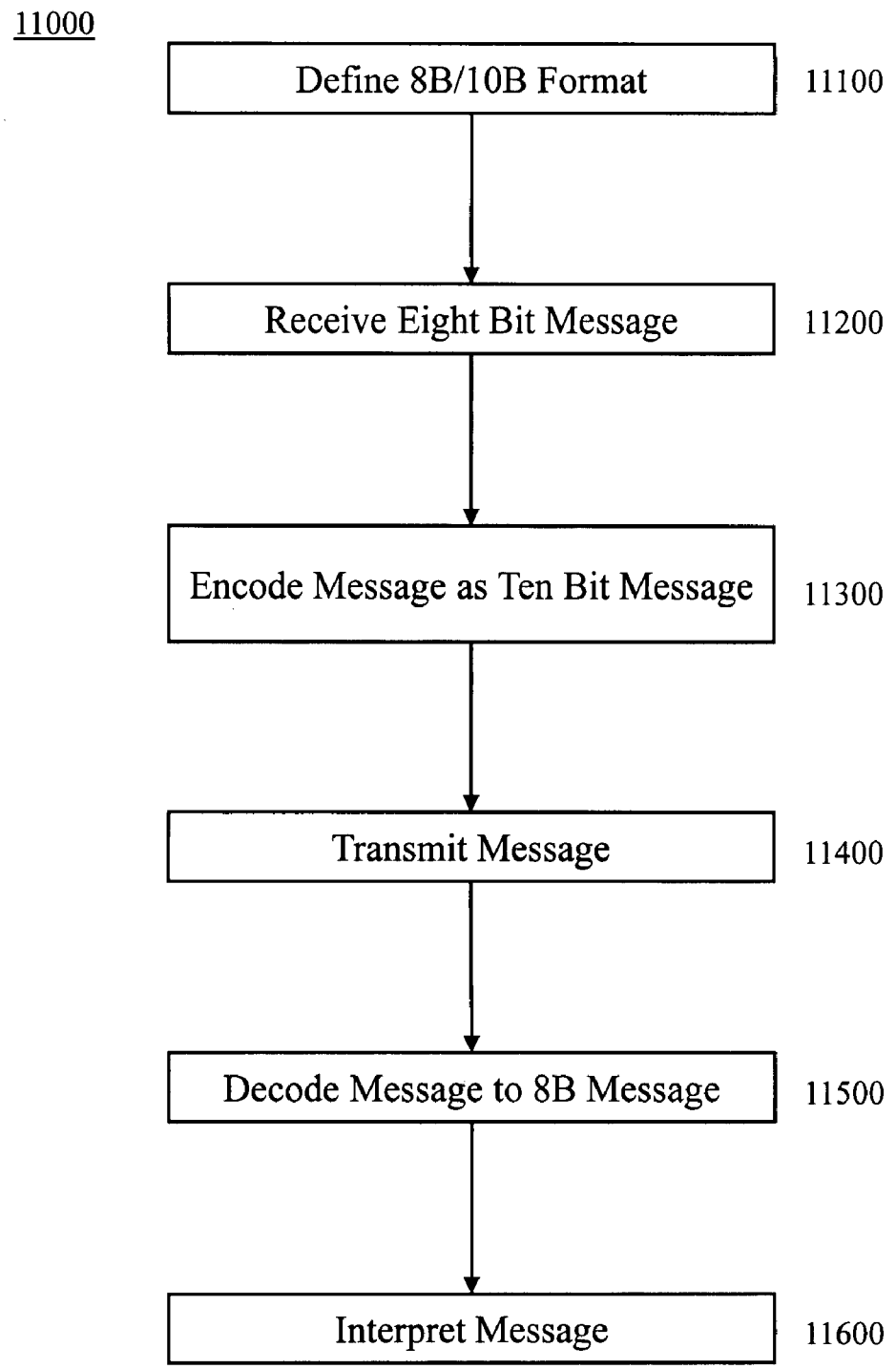
FIG. 11 is a flowchart of an exemplary embodiment of a method 11000.

FIG. 11 is a flowchart of an exemplary embodiment of a method 11000. Activities of method 11000 can be performed automatically. Automatically performed activities can be comprised by a computer program encoded on a machine-readable medium. The computer program can be adapted to implement any activity of method 11000. At activity 11100, frames associated with an 8B/10B format conversion can be defined. The 8B/10B format can be adapted to provide a relatively low DC bias.

At activity 11200, an eight bit formatted message can be received. The eight bit formatted message can be received at a PLC and/or a module communicatively coupled to the PLC. The eight bit formatted messages can comprise a plurality of distinct ordered data fields.

At activity 11300, the eight bit formatted message can be encoded as a ten bit formatted message. The message can be encoded via 8B/10B encoded frames. The message can be adapted for communication in hard real-time between an Input/Output module and the PLC. The Input/Output module can be one of a first chain of Input/Output modules communicatively coupled in series to the PLC. The Input/Output module can comprise a transmission circuit and/or a receiving circuit. The PLC can be communicatively coupled in series to a second chain of communications modules. At least one of the second chain of communications modules can be adapted to be communicatively coupled to an information device. The 8B/10B encoded frames can comprise a message type field of a size that corresponds to eight bits. A value stored in the message type field can be indicative of content of a data field of each of the frames. The message type field can follow a first ordered sequence of fields comprised by each of the frames. The first ordered sequence of fields can be and/or comprise a preamble field, a start-of-frame field, a destination address field of a size that corresponds to eight bits, a length field, and/or a source address field of a size that can corresponds to eight or more bits. The message type field can be followed by a second ordered sequence of fields comprised by each frame. The second ordered sequence can be and/or comprise a data field, a cyclic redundancy check field of a size that can correspond to 32 bits, and/or an end of frame field.

At activity 11400, the ten bit formatted message can be transmitted via a packet network. The ten bit formatted message can be transmitted to a destination via a communication module and/or an I/O module.

At activity 11500, a receiving module and/or PLC can decode the ten bit message to form the eight bit message. In certain exemplary embodiments, a processor of the receiving module and/or the PLC can decode the message.

At activity 11600, the eight bit formatted message can be interpreted by the module and/or the PLC. For example, the interpreted message can be automatically determined to be indicative of an error associated with a first message transmitted by a programmable logic controller (PLC) toward a module. The module can be adapted to transmit and the PLC can be adapted to receive the interpreted message. The interpreted message can be transmitted via an 8B/10B encoded frame that comprises an error classification and an error code. The PLC can be adapted to automatically interpret, report, and/or take corrective action responsive to error classifications indicative of information regarding the module, a receipt by the module of the first message, an ability of the module to understand the first message, and/or an ability of the module to utilize the first message. The interpreted message can comprise a device class field adapted to receive a value indicative of a device class of the module, a device type field adapted to receive a value indicative of a device type of the module, and/or a device status field adapted to receive a value indicative of a status of the module. Automatic actions of the PLC can be determined, altered, and/or modified responsive to values comprised by the device class field, the device type field and/or the device status field.

The PLC can be adapted to automatically interpret, report, and/or take corrective action responsive to error codes indicative of one or more conditions such as:
- that a message type of the first message is an unsupported message type for the module;
- that the first message attempted to assign an invalid address for an address of the module;
- that the first message attempted to enable communications with a communicatively coupled second module, and such communication had been previously enabled;
- that an incorrect input/output count was referenced by the transmitted first message;
- that an invalid component number was referenced by the transmitted first message;
- that a write operation to a memory comprised by the module failed;
- that a component update operation is in progress at the module;
- of an invalid message format in the transmitted first message; and/or
- of invalid downloaded content, of an invalid component, and/or of a disallowed memory access.

Figure 12:
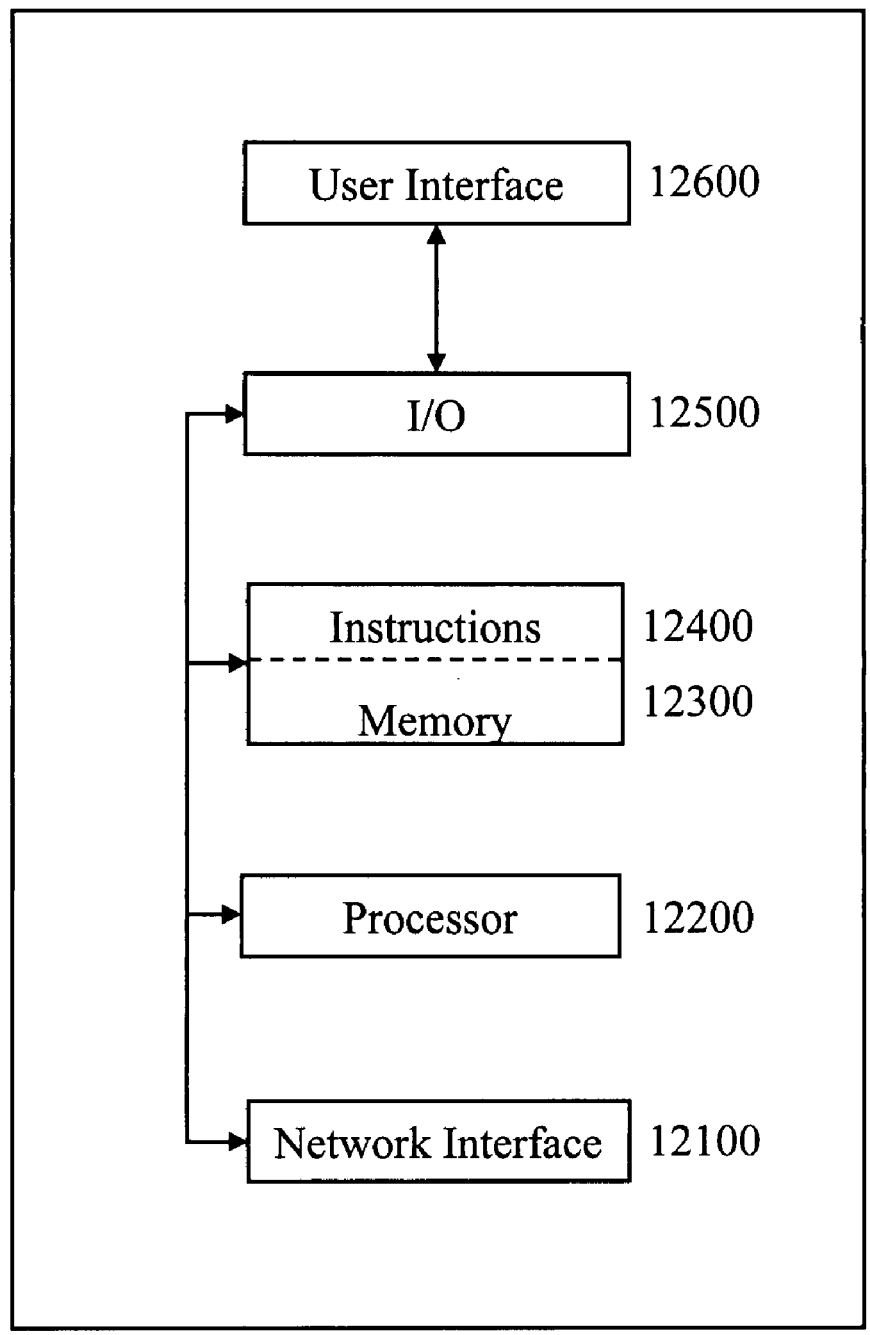
FIG. 12 is a block diagram of an exemplary embodiment of an information device 12000.

FIG. 12 is a block diagram of an exemplary embodiment of an information device 12000, which in certain operative embodiments can comprise, for example, user information device 1540 of FIG. 1. Information device 12000 can comprise any of numerous components, such as for example, one or more network interfaces 12100, one or more processors 12200, one or more memories 12300 containing instructions 12400, one or more input/output (I/O) devices 12500, and/or one or more user interfaces 12600 coupled to I/O device 12500, etc.

In certain exemplary embodiments, via one or more user interfaces 12600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

8B/10B encoded—a digital data stream formatted in a manner that maps 8-bit symbols to 10-bit symbols, each 10-bit symbol containing a difference between a count of "1" bits and a count of "0" bits of 0, +2, or −2, and the choice of symbols within a valid message being such that, when initialized to −1, a running difference between the count of "1" bits and the count of "0" bits never exceeds the range of +3 to −3, and at the end of any complete symbol is either +1 or −1. A valid message has the further property of no more than 5 consecutive "1" bits or 5 consecutive "0" bits at any point in the message for any combination of symbols.

a—at least one.

ability—a quality of being able to perform.

accept—to receive.

acknowledge—to transmit a message from a receiver of data to acknowledge that a signal, information, or packet has been received from a sender.

activity—an action, act, deed, function, step, and/or process and/or a portion thereof.

actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc).

adapted to—suitable, fit, and/or capable of performing a specified function.

address—(n.) one or more identifiers, such as one or more symbols, characters, names, and/or numbers, used for identification in information transmission, storage, and/or retrieval, the one or more identifiers assignable to a specific physical, logical, and/or virtual machine, process, node, object, entity, record, data element, component, port, interface, location, link, route, circuit, and/or network; (v.) to locate, access, assign, and/or provide an identifier a specific physical, logical, and/or virtual machine, process, node, object, entity, record, data element, component, port, interface, location, link, route, circuit, and/or network.

adjacent—in close proximity to, near, next to, and/or adjoining.

all—each and every entity of a set of entities.

allow—to provide, let do, happen, and/or permit.

and/or—either in conjunction with or in alternative to.

another—an additional one.

apparatus—an appliance or device for a particular purpose.

Application Specific Integrated Circuit (ASIC)—a microchip adapted to perform a specific function and/or procedure.

assign—to designate, appoint, allot, and/or attribute, and/or to select and set apart for a particular purpose.

assigned—to designate.

associated with—related to.

automatically—acting and/or operating in a manner essentially independent of external human influence and/or control. For example, an automatic light switch can turn on upon "seeing" a person in its view, without the person manually operating the light switch.

between—in a separating interval and/or intermediate to.

bit—an information unit that always has a value of either zero or one.

broadcast—(v.) to transmit to a plurality of receiving locations simultaneously; (n.) a simultaneous transmission to a plurality of receiving locations.

can—is capable of, in at least some embodiments.

cause—to bring about, provoke, precipitate, produce, elicit, be the reason for, result in, and/or effect.

chain—a set of devices communicatively coupled in series.

change—(v.) to cause to be different; (n.) the act, process, and/or result of altering or modifying.

character—a symbol, number, letter, and/or punctuation mark, etc., that represents data interpretable by an information device.

circuit—an electrically conductive pathway comprising one or more operative electrical devices.

close—to position a switch in a manner to communicatively couple circuit elements.

code—a system of symbols used to represent and/or indicate something, such as to represent instructions to an information device, and/or a standardized sequence of characters utilized for describing multiple, substantially identical, healthcare diagnoses and/or procedures. Code values can be used to fill record fields.

command—a signal that initiates an operation defined by an instruction.

communicate—to exchange information.

communication—a transmission and/or exchange of information.

communication module—a device and/or system adapted to receive and/or forward communications between a programmable logic controller (PLC) and devices other than sensors and actuators, such as an information device.

communications link—an established communication channel.

communicatively coupling—linking in a manner that facilitates communications.

component—a constituent element and/or part.

comprise—to include but not be limited to.

comprised by—included by.

compute—to calculate, estimate, determine, and/or ascertain via a processor.

confirm—to verify, assure, validate, and/or establish the truth of something.

contain—to hold within.

content—substance and/or substantive portion of stored data.

control—(n.) a mechanical or electronic device used to operate a machine within predetermined limits; (v.) to exercise authoritative and/or dominating influence over, cause to act in a predetermined manner, direct, adjust to a requirement, and/or regulate.

corresponding—related, associated, accompanying, similar in purpose and/or position, conforming in every respect, and/or equivalent and/or agreeing in amount, quantity, magnitude, quality, and/or degree.

count—(n.) a number reached by counting and/or a defined quantity; (v.) to increment, typically by one and beginning at zero.

couple—to join, connect, and/or link two things together.

cyclic redundancy check (CRC)—a type of function used to produce a checksum, which is a small number of bits, from a large block of data such as a packet of network traffic or a block of a computer file, in order to detect errors in transmission and/or storage. A CRC is computed and appended before transmission or storage, and verified afterwards to confirm that no changes occurred.

data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

deadline—a time interval during which an activity's completion has more utility to a system, and after which the activity's completion has less utility. Such a time interval might be constrained only by an upper-bound, or it might be constrained by both upper and lower bounds.

default—an option that is selected automatically unless an alternative is specified.

delay—an elapsed time between two states and/or events.

destination—a place, address, and/or entity to which a transmission, shipment, and/or voyage is ultimately directed.

destination address—a moniker associated with a place and/or entity to which a transmission is ultimately directed.

determine—to find out or come to a decision about by investigation, reasoning, or calculation.

device—a machine, manufacture, and/or collection thereof.

device class—a specific category of devices.

different—changed, distinct, and/or separate.

direction—a spatial relation between something and a course along which it points and/or moves; a distance independent relationship between two points in space that specifies the position of either with respect to the other; and/or a relationship by which the alignment and/or orientation of any position with respect to any other position is established.

discover—to see, get knowledge of, learn of, find, and/or find out.

download—to transfer data from a memory device.

during—at some time in a time interval.

dynamically—in an interactive manner wherein a current state is dependent on a past and/or future input and/or output.

each—every one of a group considered individually.

encode—to convert data by the use of a code, frequently one consisting of binary numbers, in such a manner that reconversion to the original form is possible.

end-of-frame characters—one or more predetermined bits and/or symbols indicative of a termination of a data packet.

error—an unintended and/or unacceptable result of an action and/or procedure.

error classification field—a group of bits indicative of a cause and/or result of an error.

error code field—a group of bits indicative of an identity of an error.

execute—to carry out a computer program and/or one or more instructions.

exist—to have actual being.

expansion module—an Input/Output module, in a housing distinct from a housing of a programmable logic controller (PLC), that is adapted to be communicatively coupled to the PLC.

fail—to be unsuccessful.

failure—a cessation of proper functioning or performance.

field—a logical storage space for a type of data. A field can contain textual, numeric, date, graphical, audio, video, animated, and/or calculated data. A field can have properties comprising a fixed or variable length, a pre-defined display format, validation properties, and/or relatability to another field.

field programmable gate array (FPGA)—a programmable processor, which when programmed with a particular circuit configuration, is adapted to perform a specific function and/or procedure.

first—an initial element of a series.

for—with a purpose of.

format—an arrangement and/or parameter of data relating to the packetizing, conveying, communicating, presenting display, and/or rendering of that data.

fourth—an element that immediately follows a third element of a series.

frame—a packet.

from—used to indicate a source.

full duplex—an ability to transport data between two nodes at a similar rate in both directions simultaneously.

further—in addition.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.

incorrect—erroneous and/or wrong in fact.

indicate—to show, mark, signal, signify, denote, evidence, evince, manifest, declare, enunciate, specify, explain, exhibit, present, reveal, disclose, and/or display.

indicative—serving to indicate.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

input—a signal, data, and/or information provided to a processor, device, and/or system.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

Input/Output module—a device and/or system adapted to receive and/or forward information between a programmable logic controller (PLC) and a predetermined set of sensors and/or actuators.

introduce—to create.

invalid—faulty and/or not valid.

invalid component number—an unrecognized and/or faulty value for a device moniker and/or identifier.

lack—a particular deficiency or absence.

length—a longest dimension of something and/or the measurement of the extent of something along its greatest dimension.

located—situated in a particular spot and/or position.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable—of a form from which an information device can obtain data and/or information.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

message—a communication.

message type—one or more characters indicative of a category of a communication.

method—a process, procedure, and/or collection of related activities for accomplishing something.

module—a device adapted to be communicatively coupled to a predetermined set of information devices, input/output devices, sensors, and/or actuators.

more—additional.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

non-fatal—not causing a cessation of execution of a computer program and/or sub-program.

not—a negation of something.

obtain—to receive, get, take possession of, procure, acquire, calculate, determine, and/or compute.

one—a single unit.

only—entirely without anything more.

open position—a switch setting that decouples an otherwise communicatively coupled connection.

output—(n) something produced and/or generated; data produced by an information device executing machine-readable instructions; and/or the energy, power, work, signal, and/or information produced by a system; (v) to provide, produce, manufacture, and/or generate.

packet—a discrete instance of communication.

pair—a quantity of two of something.

plurality—the state of being plural and/or more than one.

preamble—predefined data that is automatically appended to the beginning of transmitted data. The preamble can be an incomplete symbol, a complete symbol, or some combination of incomplete and complete symbols.

predetermined—established in advance.

prior—earlier in time.

procedure—a set of machine-readable instructions adapted to perform a specific task.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, ignitors, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

progress—an onward movement.

provide—to furnish, supply, give, convey, send, and/or make available.

rack number—a numerical value for a moniker that identifies a logical backplane of a programmable logic controller system to which a device is communicatively coupled.

real-time—a system (or sub-system) characterized by time constraints on individual activities and scheduling criteria for using those time constraints to achieve acceptable system timeliness with acceptable predictability.

receipt—an act of receiving.

receive—to gather, take, acquire, obtain, accept, get, and/or have bestowed upon.

recover procedure—a set of machine instructions adapted to cause a programmable logic controller (PLC) to perform one or more predetermined actions responsive to a failure of a communication with a module communicatively coupled thereto.

referenced—directed to.

regarding—pertaining to.

remain—stay in a same position and/or state.

repeat—to forward a message after a predetermined time delay.

repeater—a processor adapted to forward a message after a predetermined time delay.

reply—to respond to a signal, influence, and/or impetus.

request—(v.) to express a need and/or desire for; to inquire and/or ask for; (n.) that which communicates an expression of desire and/or that which is asked for.

reset—to establish a value subsequent to a previous establishment of the value and/or to return a value of a variable to a prior value of that variable.

respond—to reply.

response—a reply and/or answer.

responsive—reacting to an influence and/or impetus.

said—when used in a system or device claim, an article indicating a subsequent claim term that has been previously introduced.

second—an element that immediately follows an initial element of a series.

send—to convey, dispatch, and/or transmit.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electro-magnetic radiation, etc.) and convert that physical quantity into a signal. Examples include proximity switches, stain gages, photo sensors, thermocouples, level indicating devices, speed sensors, accelerometers, electrical voltage indicators, electrical current indicators, on/off indicators, and/or flowmeters, etc.

serially transmitted message—a communication wherein each part of a whole is provided in sequence.

series—an arrangement of components in an electrical circuit one after the other so that the electrical current is not split therebetween.

set—to establish a value.

signal—information, such as machine instructions for activities, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real-time, continuously generated, continuously varying, analog, discretely generated, discretely varying, quantized, digital, continuously measured, and/or discretely measured, etc.

slot number—a numerical value of a moniker that identifies a logical location on a predetermined logical backplane of a programmable logic controller system to which a device is communicatively coupled.

soft deadline—the general case where completing the activity by the deadline results in the system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with the anti-lock braking system where a slowdown in response would likely cause system failure, possibly even catastrophic failure.

source address—a moniker associated with a place and/or entity from which a transmission is sent and/or forwarded.

start-of-frame characters—one or more predetermined bits and/or symbols indicative of a beginning of a data packet.

state—a condition of an entity at a given time.

status—a state and/or condition and/or information related thereto.

store—to place in a memory device.

subsequent—following in time.

substantially—to a considerable, large, and/or great, but not necessarily whole and/or entire, extent and/or degree.

switch—(n) a mechanical, electrical, and/or electronic device that opens and/or closes circuits, completes and/or breaks an electrical path, and/or selects paths and/or circuits and/or a device that establishes a connection between disparate transmission path segments in a network (or between networks); (v) to electrically energize or de-energize.

system—a collection of mechanisms, devices, data, and/or instructions, the collection designed to perform one or more specific functions.

third—an element that immediately follows a second element of a series.

toward—in a physical and/or logical direction of.

transfer—to transmit from one device to another.

transmit—to provide, furnish, supply, send as a signal, and/or to convey (e.g., force, energy, and/or information) from one place and/or thing to another.

type—a number of things having in common traits or characteristics that distinguish them as a group or class.

un-configured—lacking information in a module that allows communications between a device, via the module, and a programmable logic controller (PLC).

understand—to comprehend an intended meaning.

unsupported—not maintained and/or defined.

until—up to a time when.

update—to change.
used—employed in accomplishing something.
utilize—to use and/or put into service.
value—a measured, assigned, determined, and/or calculated quantity or quality for a variable and/or parameter.
via—by way of and/or utilizing.
when—at a time.
wherein—in regard to which; and; and/or in addition to.
write operation—one or more actions adapted to code data on a memory device.

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A system comprising:
a first module of a first chain of modules, each adjacent pair of said first chain of modules communicatively coupled in series to a programmable logic controller (PLC), said first module comprising a transmitting circuit, a receiving circuit, and repeater circuits, said first module adapted to communicate with said PLC via 8B/10B encoded frames, said first module comprising a first repeater which repeats transmissions from the direction of the PLC to a second module of said first chain of modules, said first repeater comprising a first switch, said first switch adapted to default to an open position prior to an assignment of a module address to said first module by said PLC, said first switch adapted to remain in said open position until said module address is assigned to said first module, said first module further comprising a second repeater which repeats transmissions from the direction of the second module to the direction of the PLC, said second repeater comprising a second switch selecting whether communication toward the PLC is from the first module transmission circuit or repeated from the second module.

2. The system of claim 1, further comprising:
a second chain of modules, each adjacent pair of said second chain of modules communicatively coupled in series to said PLC.

3. The system of claim 1, further comprising:
a second chain of modules, each adjacent pair of said second chain of modules communicatively coupled in series to said PLC, wherein said second chain of modules comprise communication modules.

4. The system of claim 1, further comprising:
said PLC.

5. The system of claim 1, wherein said first switch is adapted to close subsequent to said assignment of said module address to said first module.

6. The system of claim 1, wherein said second switch is dynamically controlled to allow transmission from the first module toward the PLC when the first module has information to send, or selects the second repeater to allow any message presented from the direction of the second module to be repeated toward the PLC.

7. The system of claim 1, wherein first chain of modules comprises only Input/Output modules.

8. The system of claim 1, wherein said first module is implemented via an ASIC controlled by machine instructions.

9. The system of claim 1, wherein said PLC is implemented via an ASIC controlled by machine instructions.

10. The system of claim 1, wherein said first module is implemented via software.

11. The system of claim 1, wherein said first module is implemented via firmware.

12. The system of claim 1, wherein said PLC is implemented via firmware.

13. The system of claim 1, wherein said first module is implemented via an FPGA controlled by machine instructions.

14. The system of claim 1, wherein said PLC is implemented via an FPGA controlled by machine instructions.

15. A method comprising:
transmitting a message from a programmable logic controller (PLC) that is communicatively coupled to a first module of a first chain of modules, each adjacent pair of said first chain of modules communicatively coupled in series, each of said first chain of modules Input/Output modules adapted to communicate with said PLC in hard real-time, said PLC communicatively coupled to a second chain of modules, each adjacent pair of said second chain of modules communicatively coupled in series, each of said second chain of modules a communications module, said first module comprising a transmitting circuit, a receiving circuit, and repeater circuits, said first module adapted to communicate with said PLC via 8B/10B encoded frames, said first module comprising a first repeater which repeats transmissions from the direction of the PLC to a second module of said first chain of modules, said first repeater comprising a first switch, said first switch adapted to default to an open position prior to an assignment of a module address to said first module by said PLC, said first switch adapted to remain in said open position until said module address is assigned to said first module, said first module further comprising a second repeater which repeats transmissions from the direction of the second module to the direction of the PLC, said second repeater comprising a second switch selecting whether communication toward the PLC is from the first module transmission circuit or repeated from the second module, each of said 8B/10B encoded frames comprising message type field of a size that corresponds to eight bits, a value stored in said message type field indicative of content of a data field of said frame, said message type field following a first ordered sequence of fields comprised by said frame, said first ordered sequence of fields, a preamble field, a start-of-frame field, a destination address field of a size that corresponds to eight bits, a length field, and a source address field of a size that corresponds to eight bits, said message type field followed by a second ordered sequence of fields comprised by said frame, said second ordered sequence comprising a data field, a cyclic redundancy check field of a size that corresponds to 32 bits, and an end of frame field.

16. A machine-readable medium comprising machine instructions for activities comprising:

communicatively coupling a programmable logic controller (PLC) to a first module of a chain of modules, each adjacent pair of said chain of modules communicatively coupled in series, said first module comprising a transmitting circuit, a receiving circuit, and repeater circuits, said first module adapted to communicate with said PLC via 8B/10B encoded frames, said first module comprising a first repeater which repeats transmissions from the direction of the PLC to a second module of said chain of modules, said first repeater comprising a first switch, said first switch adapted to default to an open position prior to an assignment of a module address to said first module by said PLC, said first switch adapted to remain in said open position until said module address is assigned to said first module, said first module further comprising a second repeater which repeats transmissions from the direction of the second module to the direction of the PLC, said second repeater comprising a second switch selecting whether communication toward the PLC is from the first module transmission circuit or repeated from the second module.

17. A system comprising:

a circuit adapted to communicatively couple a programmable logic controller (PLC) to a first module of a chain of modules, each adjacent pair of said chain of modules communicatively coupled in series, said first module comprising a transmitting circuit, a receiving circuit, and repeater circuits, said first module adapted to communicate with said PLC via 8B/10B encoded frames, said first module comprising a first repeater which repeats transmissions from the direction of the PLC to a second module of said chain of modules, said first repeater comprising a first switch, said first switch adapted to default to an open position prior to an assignment of a module address to said first module by said PLC, said first switch adapted to remain in said open position until said module address is assigned to said first module, said first module further comprising a second repeater which repeats transmissions from the direction of the second module to the direction of the PLC, said second repeater comprising a second switch selecting whether communication toward the PLC is from the first module transmission circuit or repeated from the second module.

* * * * *